United States Patent
Bal et al.

(10) Patent No.: US 7,505,851 B2
(45) Date of Patent: Mar. 17, 2009

(54) USE OF MULTI-COMPONENT MEASUREMENTS IN DELINEATING GEOLOGY OF DEEP-WATER SEDIMENTS

(75) Inventors: Adriaan A. Bal, Perth (AU); David J. Prosser, Perth (AU); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 29 days.

(21) Appl. No.: 11/746,963

(22) Filed: May 10, 2007

(65) Prior Publication Data

US 2007/0265784 A1    Nov. 15, 2007

Related U.S. Application Data

(60) Provisional application No. 60/799,132, filed on May 10, 2006.

(51) Int. Cl.
    *G01V 3/00* (2006.01)
(52) U.S. Cl. .......................................... 702/7
(58) Field of Classification Search .............. 702/7
    See application file for complete search history.

(56) References Cited

U.S. PATENT DOCUMENTS

| | | | |
|---|---|---|---|
| 5,446,654 A * | 8/1995 | Chemali et al. ............... 702/7 |
| 6,470,274 B1 | 10/2002 | Mollison et al. ............... 702/7 |
| 6,493,632 B1 | 12/2002 | Mollison et al. ............... 702/2 |
| 6,643,589 B2 | 11/2003 | Zhang et al. ............... 702/7 |
| 6,686,736 B2 | 2/2004 | Schoen et al. ............... 324/303 |
| 6,711,502 B2 | 3/2004 | Mollison et al. ............... 702/6 |
| 6,794,875 B2 | 9/2004 | Strickland ............... 324/343 |
| 2007/0150200 A1 | 6/2007 | Charara et al. ............... 702/6 |
| 2007/0168133 A1 | 7/2007 | Bennett et al. ............... 702/6 |

* cited by examiner

*Primary Examiner*—Bryan Bui
*Assistant Examiner*—Jonathan Teixeira Moffat
(74) *Attorney, Agent, or Firm*—Madan, Mossman & Sriram, P.C.

(57) ABSTRACT

Multicomponent induction measurements are used to estimate horizontal and vertical resistivities of an earth formation. From these resistivity estimates, Net/gross sand thicknesses may be estimated. These are indicative of the position of the well within a deep water channel sequence. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

14 Claims, 7 Drawing Sheets

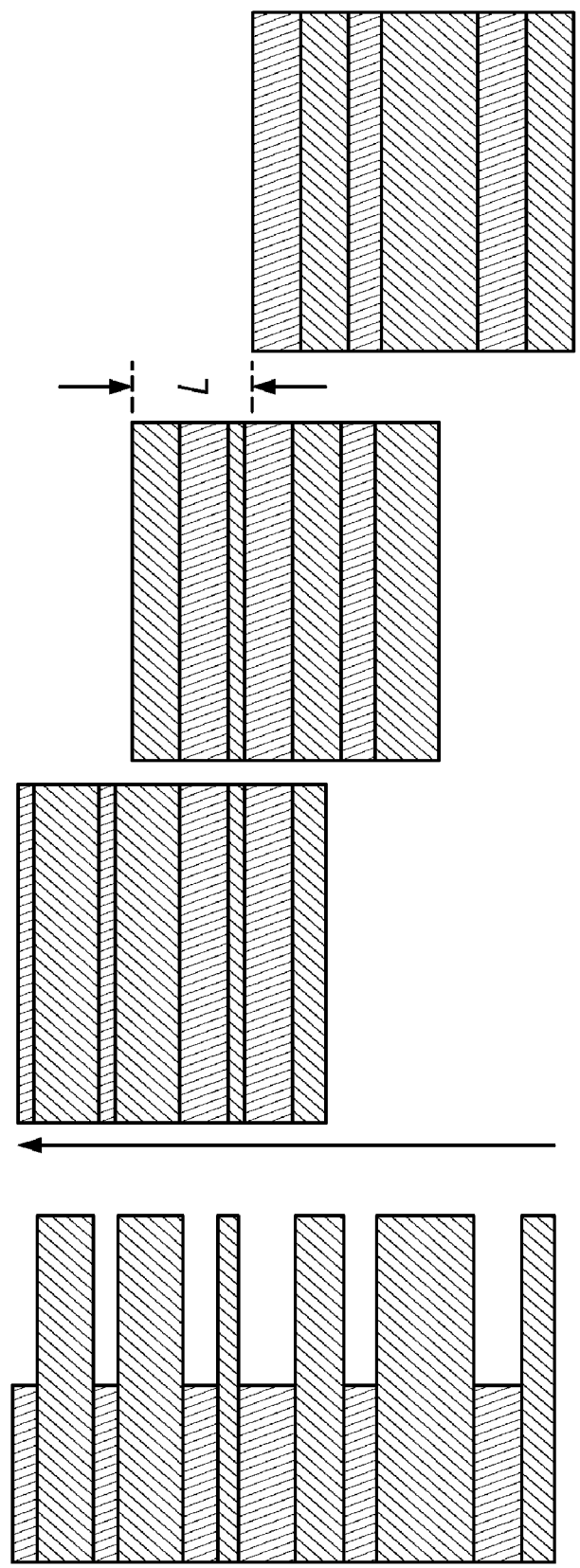

USE OF MULTI-COMPONENT MEASUREMENTS IN DELINEATING GEOLOGY OF DEEP-WATER SEDIMENTS

CROSS-REFERENCES TO RELATED APPLICATIONS

This application claims priority from U.S. provisional patent application Ser. No. 60/799,132 filed on May 10, 2006.

BACKGROUND OF THE INVENTION

1. Field of the Invention

The invention is related generally to the use of resistivity measurements for evaluation of earth formations that include deep-water sediments.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

One problem of particular interest is the evaluation of deep-water deposits in the subsurface. A cross-section of a deep-water channel sequence is shown in FIG. 3. The sequence is characterized by interbedded sands and shales with the relative thickness depending upon the relative position (horizontal and vertical) within the sequence. Prior art methods have used high resolution image logs (such as resistivity image logs) to identify channels, to use changes in dip trends and net-to-gross sand values (N/G) to identify channels and slumps. Specifically, at a location such as 201 near the center of the channel complex, the ratio N/G is large, is smaller at a location such as 202 and still smaller near the fringes of the channel at a location such as 203. Prior art methods have also used gamma ray logs to help define larger scale trends.

Image logs suffer from the drawback that they are basically limited to borehole wall observations and hence cannot "see" into the formation. This makes it difficult to evaluate the importance of thin mudstone beds within a sand layer away from the borehole. In addition, the data may be of poor quality, making it difficult to evaluate the dips of beds seen in the image. Image logs are affected by washouts and poor borehole conditions. Evaluation of the formation would be greatly improved if dips that are indicative of larger-scale trends (of the order of 2 m or more) could be evaluated. The ability to measure net to gross (N/G) ratio and evaluation of bed thickness trends is also important.

The 3DEX™ tool of Baker Atlas has a depth of investigation in the formation that is typically several meters and correspond to large-scale dip and azimuth. In contrast, the dips and azimuths from imaging devices are derived from the property (e.g., resistivity) boundaries of formation beds or laminations. When the beds or laminations are below the resolution of the imaging devices, the dips and azimuths are reliably determined. In contrast, the 3DEX measurements are sensitive to the orientation of the formation conductivity tensor. The measurements allow accurate determination of the dips and azimuths in the absence of bed boundaries, provided there exists measurable formation anisotropy. Hence, in many instances the imaging-derived dips and azimuths may be different from the 3DEX-derived ones.

U.S. patent application Ser. No. 11/740,376 of Wang et al., having the same assignee as the present application and the contents of which are incorporated herein by reference discusses in some detail the utility of multicomponent resistivity measurements, such as 3DEX™ measurements, in determination of formation dips away from the borehole and of identifying and delineating unconformities using multicomponent measurements. As noted therein, the different depths of investigation (DOI) and different vertical resolution of the multicomponent resistivity measurement and the conventional borehole imaging logs will in some circumstances result in different dips and azimuths. The borehole imaging tools usually have DOIs less than a few centimeters, whereas the multicomponent resistivity measurement reads meters into the formation. Therefore, the two measurements will read the same angles if the angles do not change significantly from the borehole. When formation angles change laterally, Wang discusses how the measurement "averaging" affects the angle data derived from 3DEX tool measurements.

U.S. Pat. No. 6,470,274 to Mollison et al. and U.S. Pat. No. 6,493,632 to Mollison et al. having the same assignee as the present application and the contents of which are fully incorporated herein by reference discloses use of a multi-component logging tool (the 3DEX tool of Baker Hughes Incorporated) for determination of anisotropic resistivity parameters of a laminated reservoir. As would be known to those versed in the art, such a laminated reservoir that has layers of different resistivities exhibits transverse isotropy even if the layers themselves are isotropic. Such a multicomponent logging tool has azimuthal sensitivity. The two Mollison patents disclose a method of analyzing data from a multicomponent logging tool to determine water saturations of the sand and shale fractions of the reservoir. The model used in Mollison assumes that the anisotropy axis is normal to the bedding plane. Similar models have been assumed in, for example, U.S. Pat. No. 6,643,589 to Zhang et al. U.S. Pat. No. 6,686,736 to Schoen et al., having the same assignee as the present invention and the contents of which are incorporated herein by reference, teaches the determination of the distribution of shales, sands and water in a reservoir including laminated shaly sands using vertical and horizontal conductivities is derived from nuclear, NMR, and multi-component induction data. The multicomponent data are inverted and an estimate of the laminated shale volume from this inversion is compared with an estimate of laminated shale volume from nuclear logs. The bulk water volume determined from the inversion is compared with a bulk irreducible water volume from NMR measurements. NMR data are then used to obtain a sand distribution in the reservoir and this sand distribution is used in a second inversion of the multicomponent data. Alternatively, a bulk permeability measurement is used as a constraint in inverting the properties of the anisotropic sand component of the reservoir. From the resistivities of the sand laminae, empirical relations are used to predict anisotropic reservoir properties of the reservoir.

The present invention is directed towards the use of 3DEX measurements to characterize geologic formations away from the borehole and/or to compare the results of this characterization with borehole imaging logs.

SUMMARY OF THE DISCLOSURE

One embodiment of the disclosure is a method of evaluating an earth formation. The method includes making measurements with a multicomponent resistivity logging tool at a plurality of depths in a borehole in the earth formation and estimating from the measurements a first cumulative sand thickness in a first interval of the earth formation, estimating from the measurements a second cumulative sand thickness in a second interval of the earth formation wherein the second interval encompasses the first interval. The method further includes using the first estimated cumulative sand thickness and the second estimated cumulative sand thickness for determining a maximum sand thickness within a portion of the second interval not included in the first interval. Estimating the first cumulative sand thickness and the second cumulative sand thickness may be done using a horizontal resistivity and a vertical resistivity derived from the measurements made by the multicomponent logging tool. The measurements made by the multicomponent logging tool may be used for estimating a dip of the formation and/or an azimuth of the formation. The measurements made by the multicomponent logging tool may be used for estimating a dip angle of an unconformity in the formation and/or an azimuth angle of an unconformity in the formation. The logging tool may be conveyed in a borehole using a conveyance device that may be a wireline, a slickline, or a drilling tubular. The determined maximum sand thickness may be greater than a length of the non-overlap portion and the method may further include estimating the maximum sand thickness for another interval encompassing the first interval.

Another embodiment is an apparatus for evaluating an earth formation. The apparatus includes a multicomponent resistivity logging tool configured to make measurements at a plurality of depths in a borehole in the earth formation, and a processor configured to estimate from the measurements a first cumulative sand thickness in a first interval in the formation, estimate from the measurements a second cumulative sand thickness in a second interval of the earth formation, the second interval encompassing the first interval, use the first estimated cumulative sand thickness and the second estimated cumulative sand thickness to determine a maximum sand thickness within a portion of the second interval not included in the first interval, and record the maximum sand thickness on a suitable medium. The processor may be further configured to estimate the first cumulative sand thickness and the second cumulative sand thickness by using a horizontal resistivity and a vertical resistivity derived from the measurements made by the multicomponent logging tool. The processor may be further configured to use the measurements made by the multicomponent logging tool for estimating a dip of the formation and/or an azimuth angle of the formation. The processor may be configured to use the measurements made by the multicomponent logging tool for estimating a dip angle of an unconformity in the formation and/or an azimuth angle of an unconformity in the formation. The apparatus may further include a conveyance device configured to convey the logging tool into the borehole, the conveyance device being selected from a wireline, a slickline, or a drilling tubular. The determined sand thickness may be greater than a length of the portion of non-overlap.

Another embodiment of the invention is a computer readable medium for use with a multicomponent induction logging tool. The medium includes instructions which enable a processor to estimate from measurements made by the logging tool a maximum thickness of a sand bed within an interval in the earth formation. The medium may be a ROM, an EPROM, an EEPROM, a flash memory, and/or an optical disk.

BRIEF DESCRIPTION OF THE FIGURES

The present invention is best understood with reference to the following figures in which like numbers refer to like components and in which:

FIG. 6A shows an exemplary sand-shale sequence;

FIGS. 6B-6D shows how the sequence of FIG. 6A would be sampled by a number of overlapping 3DEX measurements;

DETAILED DESCRIPTION OF THE INVENTION

Figure 1:
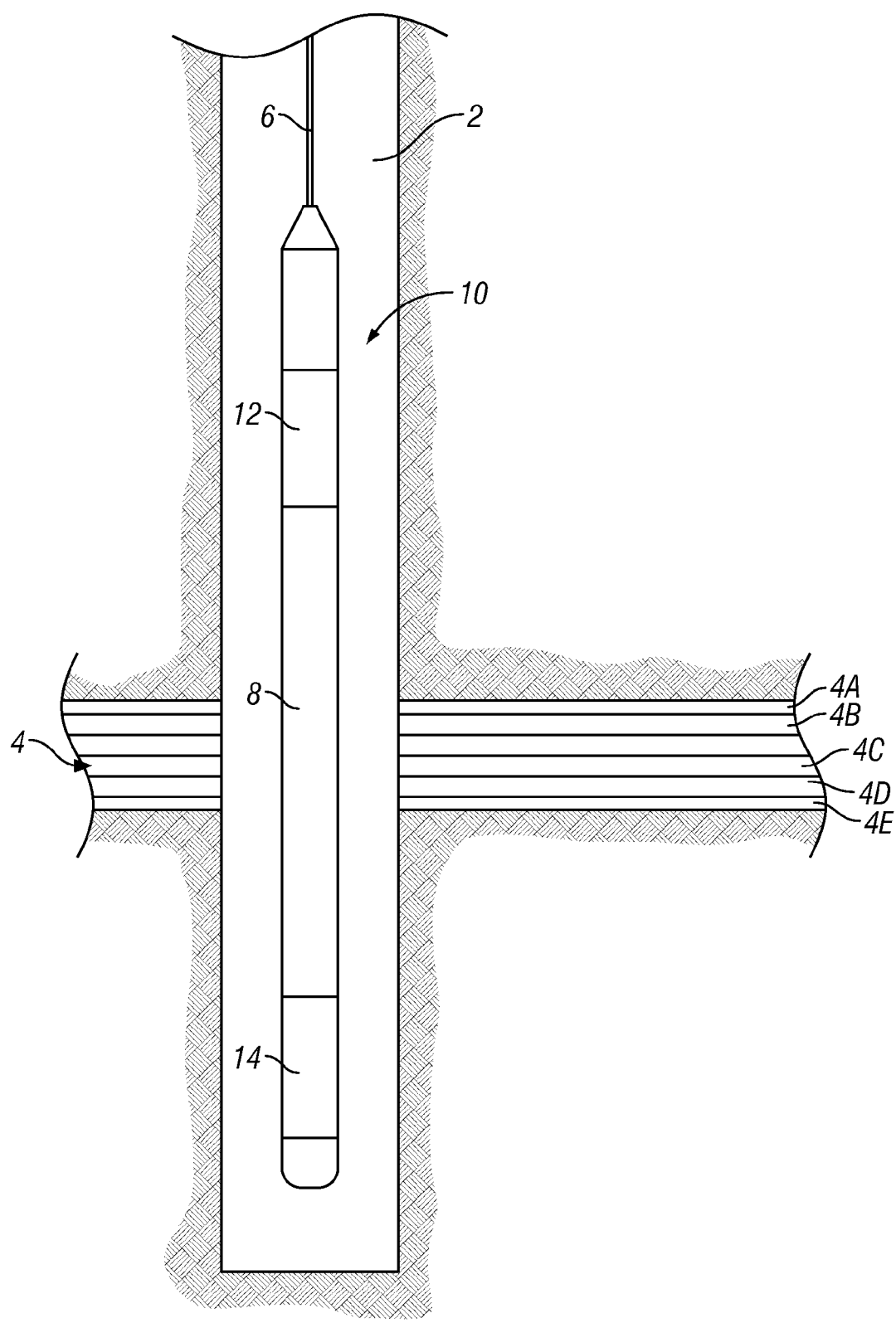
FIG. 1 illustrates an induction instrument disposed in a wellbore penetrating an earth formation.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor which controls the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4E of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
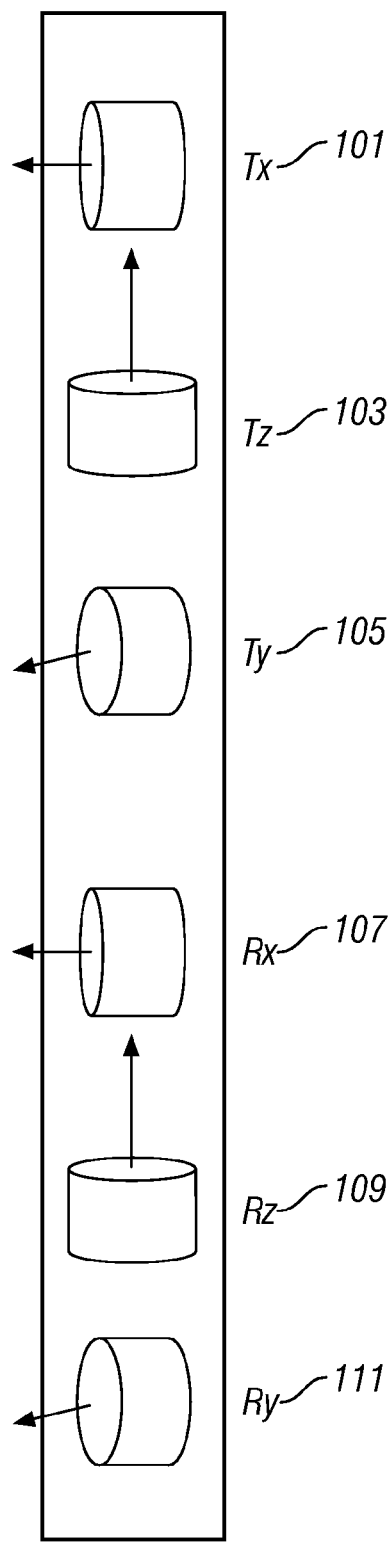
FIG. 2 (prior art) illustrates the arrangement of transmitter and receiver coils in multicomponent induction logging tool marketed under the name 3DEX™.
Figure 3:
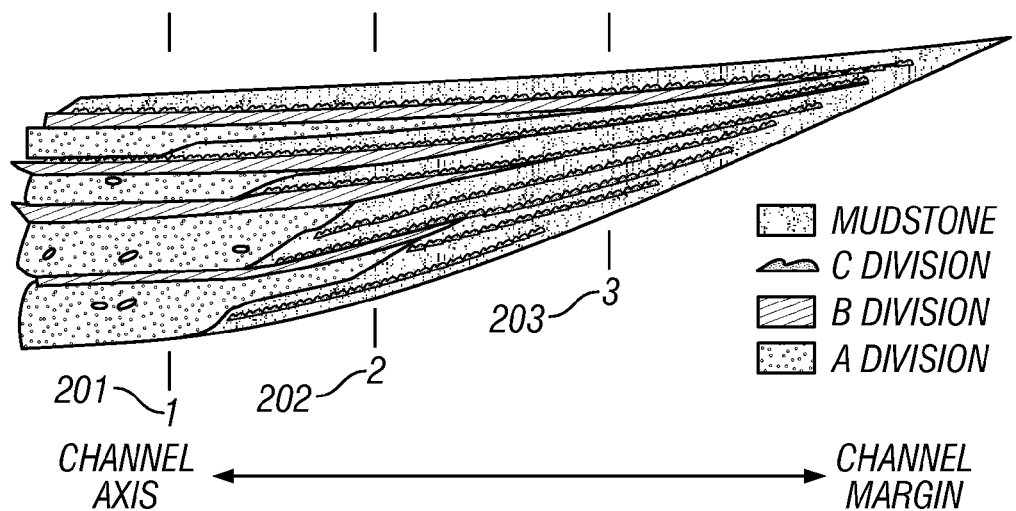
FIG. 3 is a schematic cross-section of an exemplary deepwater channel sequence including a number of major sand units.

Referring to FIG. 2, the configuration of transmitter and receiver coils in the 3DEX™ multicomponent induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used. It should further be noted that measurements made with other coil inclinations may also be used for the method of the present invention using the well-known principles of coordinate rotation.

Figure 4:
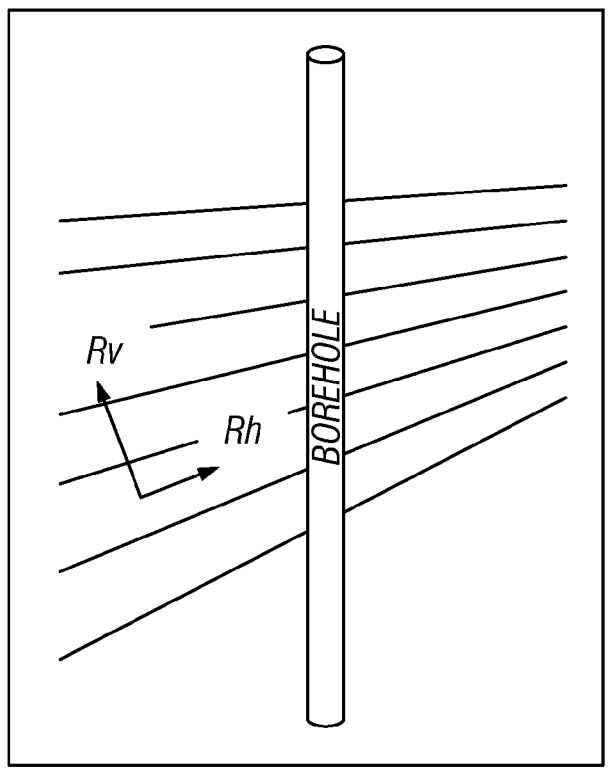
FIG. 4 is a model showing a gradual increase in dip with borehole depth.

Many geologic formations, such as channels, are characterized by a gradual change in dip. This is schematically illustrated by the model shown in FIG. 4 in which the dip increases by 20° per 100 ft (6.6° per 10 m). The formation is anisotropic with $R_h$ and $R_v$ equal to 1 Ω-m and 4 Ω-m respectively. The conductivity tensor is tilted according to the local dip angle. Unlike an anisotropic formation with parallel bedding planes, a gradual change in dip causes nonparallel bedding planes. Hence, $R_h$ and $R_v$ measured over a larger volume will be different from those from a smaller volume. In other words, the resistivity anisotropy will be scale-dependent. On the other hand, the resistivity anisotropy for a formation with parallel bedding planes will be scale-independent. As discussed in Wang et al., 3DEX measurements can accurately determine formation dips away from the borehole. Thus, in one embodiment of the invention, dips estimated from multicomponent measurements may be used for identifying the location of a borehole within a channel sequence.

Figure 5:
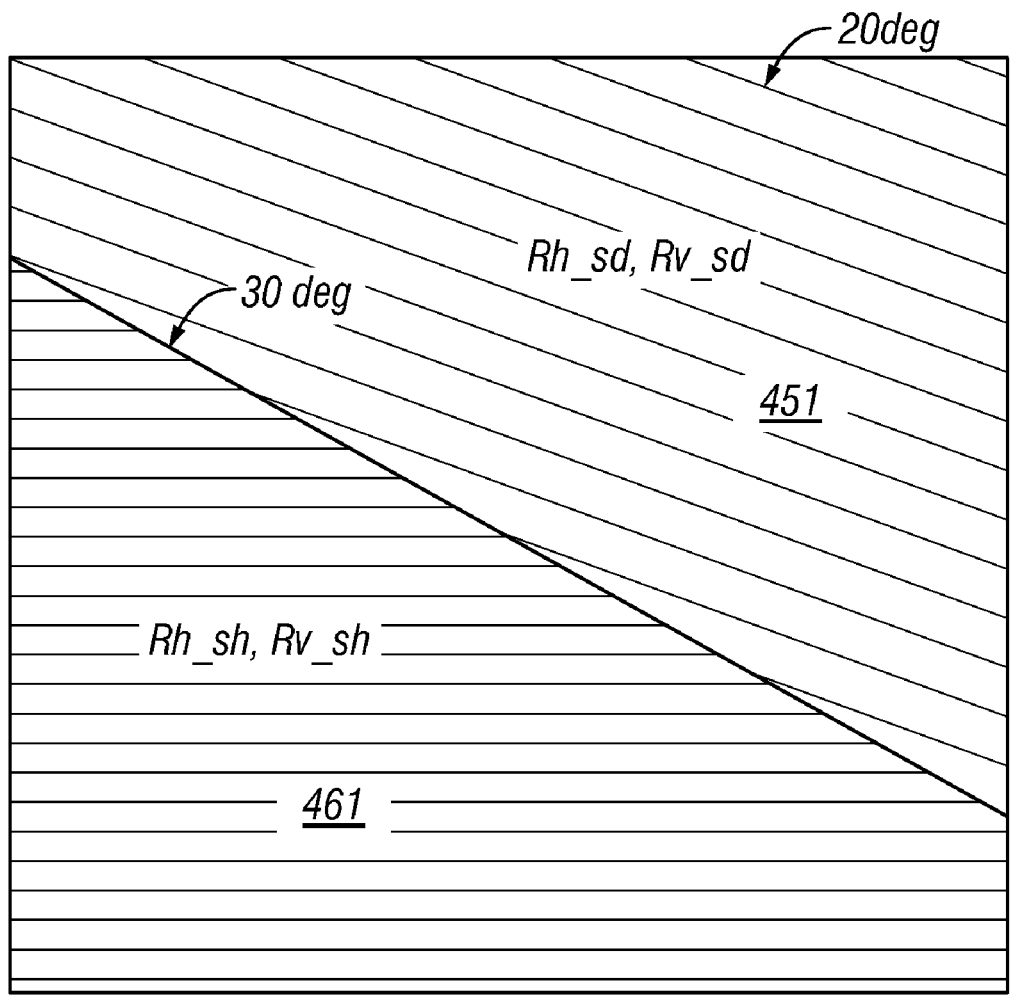
FIG. 5 illustrates an unconformity boundary of a channel sand in a shale layer.

As can be seen geologic formations may include channel sands that commonly cut into and through preexisting sediments, causing lithological and typically a bedding angle offset. The channel boundary between the channel sands and the pre-existing sediments is generally not parallel and, therefore, the interpretation of dip from 3DEX is much more difficult than for a set of layered planar beds. In FIG. 5, both the channel sand 451 and the underlying formation 461 can be anisotropic and have different dip angles. In the example shown, the channel sand has dip at 20° to the right. The underlying formation is assumed to be horizontal. The boundary between the sand and the underlying formation dips at 30° to the right. Four different cases of such an unconformity have been discussed in Wang. As discussed therein, multicomponent resistivity measurements can be used to determine not only the bedding angles above and below the unconformity but also the dip angle and the azimuth angle of the unconformity itself. In the context of the present invention, this means that multicomponent measurements may be used to identify unconformities crossed by a later channel cutting into earlier sediments.

Once the cross-bedding resistivity parameters have been determined, further processing may be done to determine petrophysical parameters characterizing the cross-bedding using known methods. Determination of water saturation and of fractional volumes of sand and shale components is discussed, for example, in U.S. Pat. Nos. 6,711,502, 6,493,632 and 6,470,274 to Mollison et al., having the same assignee as the present invention.

Mollison '274 teaches determination of the total porosity of a formation, a fractional volume of the shale, water saturation, and a resistivity of the shale in a laminated reservoir including sands that may have dispersed shales therein. A tensor petrophysical model determines the laminar shale volume and laminar sand conductivity from vertical and horizontal conductivities derived from multi-component induction log data. NMR data are used to obtain measurements of the total clay-bound water in the formation and the clay bound water in shales in the formation. Mollison '502 teaches determination of the total porosity of a formation, a fractional volume of the shale, and a resistivity of the shale in a laminated reservoir including sands that may have dispersed shales therein. A tensor petrophysical model determines the laminar shale volume and laminar sand conductivity from vertical and horizontal conductivities derived from multi-component induction log data. The volume of dispersed shale and the total and effective porosities of the laminar sand fraction are determined using a Thomas-Stieber-Juhasz approach. Removal of laminar shale conductivity and porosity effects reduces the laminated shaly-sand problem to a single dispersed shaly-sand model to which the Waxman-Smits equation can be applied.

In one embodiment of the invention, use is made of the method taught in U.S. Pat. No. 6,686,736 to Schoen et al., having the same assignee as the present invention and the contents of which are incorporated herein by reference. Taught therein is a method for determining the coarse- and fine-grained fraction of a laminated sequence and estimation of permeabilities of the coarse- and fine-grained components.

In one embodiment of the invention, use is made of multi-component measurements in overlapping gates to get an estimate of the maximum possible sand thickness within an interval. Shown in FIG. 6A is an exemplary sedimentary column that includes sands and shales. By way of explanation, it is common practice to show in stratigraphic columns the harder intervals (sand in the present case) extending out more than the softer and more easily eroded intervals (shale in the present case). The sands are indicated by the stippled intervals while the shales are shown in black. Shown in FIGS. 6B, 6C and 6D are exemplary depth intervals that would be sampled by a 3DEX tool. The successive depth intervals overlap and have an interval of length L that is not common to adjacent sampled intervals. For example, the length L may be 10 cm. This is not intended to be a limitation to the method of the present invention.

Figure 7A:
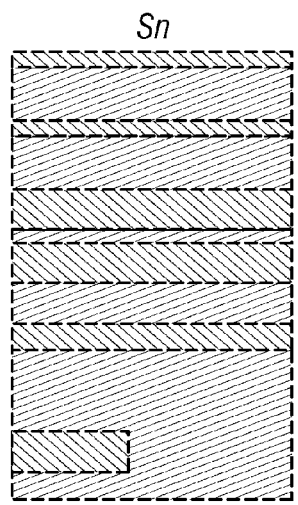
FIGS. 7A-7C show results of accumulating sand volume estimates from overlapping volumes.
Figure 7B:
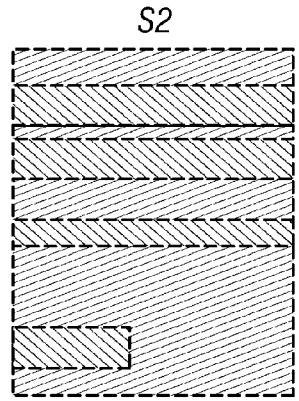
Figure 7C:
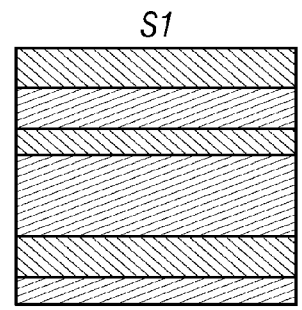

Turning to FIGS. 7A-7C, we illustrate a method of the invention. Referring first to FIG. 7C, we denote the volume of investigation by volume 1 and denote the cumulative sand thickness in this volume by $S_1$. An estimate of $S_1$ can be obtained by averaging the determined sand thicknesses for measurements made at each point within the volume 1. Volume 2 in FIG. 7B includes the volume 1 of FIG. 7C plus an additional volume sampled by the tool in a position corresponding to FIG. 6C. The cumulative sand thickness for volume 2 is $S_2$ and can be estimated from averaging the determined sand thicknesses for measurements made at each point within volume 2. Similarly, a cumulative sand thickness $S_n$ for any volume n may be defined.

The net sand thickness in the interval of length L is then given by $S_n - S_{n-1}$, and the sand percentage in the interval of length L is given by $$\Delta Sand = 100 \frac{(S_n - S_{n-1})}{L}.$$

Clearly if $\Delta Sand > 100$, the bed thickness is greater than the step size L. In this case, the process is iterated for successive overlapping volumes until $\Delta Sand < 100$. The sand bed thickness is then given by $$T = (n+f)L$$

where T is the bed thickness, n is the number of iterations, and f is the percent sand in the final iteration. If, on the other hand, ΔSand<100, then the maximum possible thickness of a sand within an interval is ΔSand×L. It should be noted that the interval $S_n$ encompasses the interval $S_{n-1}$ and that the sand bed thickness is estimated for the portion of the interval $S_n$ not included in the interval $S_{n-1}$.

Figure 8:
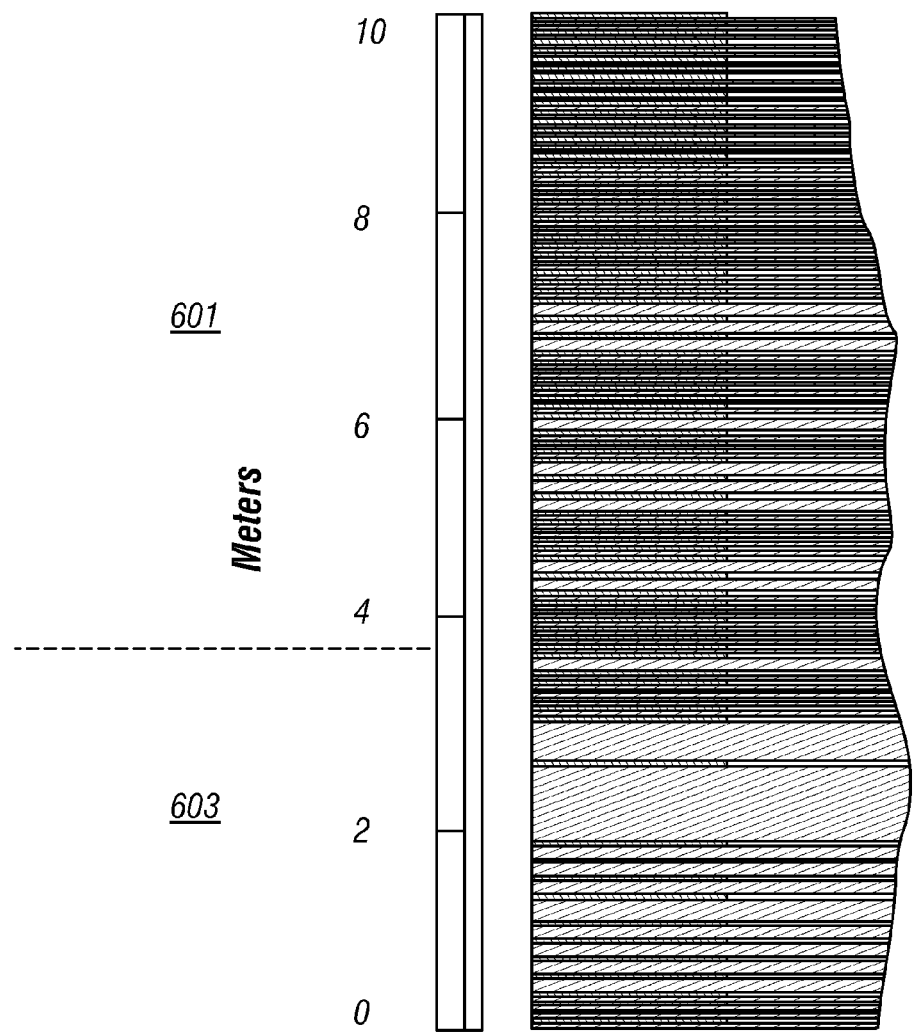
FIG. 8 is a log showing the maximum possible sand thickness in a sedimentary column.

FIG. 8 is a log showing the maximum possible sand thickness in a sedimentary interval. The upper interval 601 comprises thin bedded sands with low N/G ratio. The lower interval 603 comprises thick bedded sandstones with high N/G ratio and is likely to be more productive than the upper interval.

Figure 9:
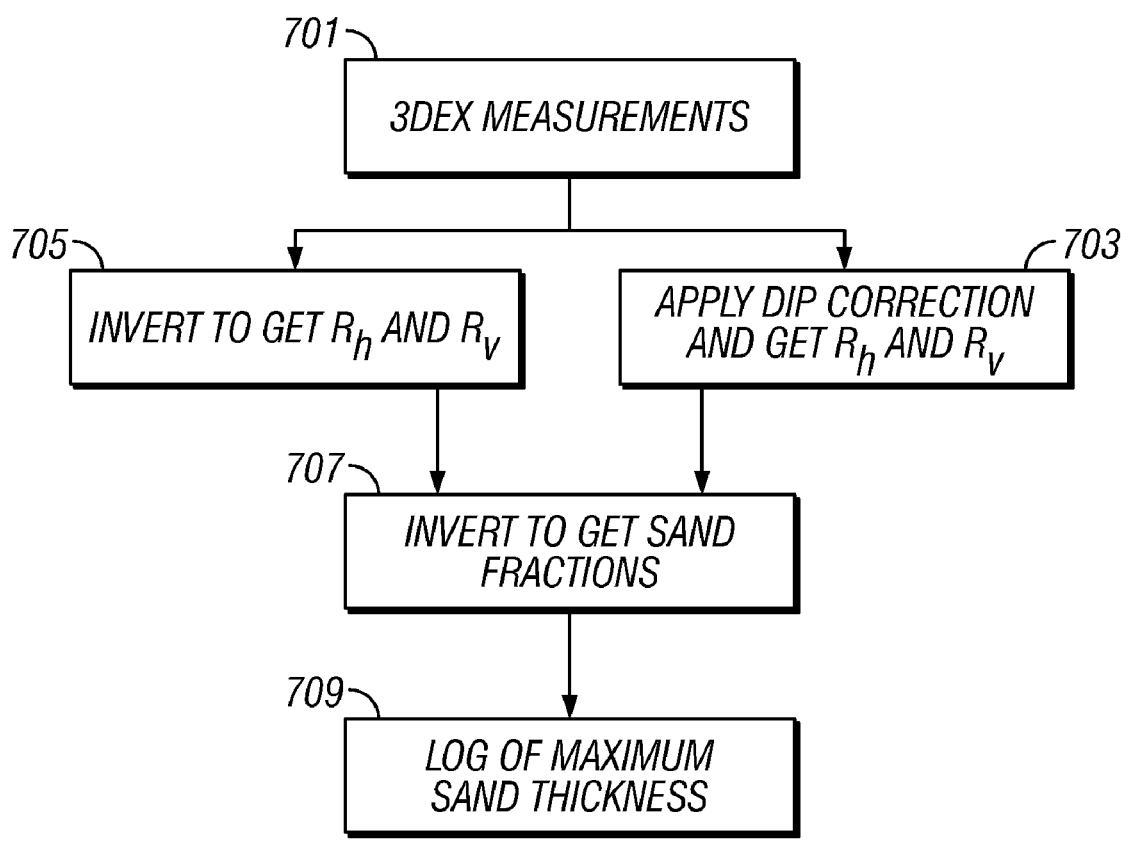
FIG. 9 is a flow chart illustrating possible sequences of steps of the present invention.

FIG. 9 summarizes some of the possible sequences of steps that may be used in the present invention. Multicomponent measurements are obtained 701. In one embodiment, the steps discussed in Wang may be implemented to give $R_h$ and $R_v$ 703. From the estimated values of $R_h$ and $R_v$, sand and/or shale fractions and/or thicknesses are estimated 707. Step 707 may be based on other measurements, such as gamma ray measurements and/or NMR measurements. From the sand and/or shale fractions and/or thicknesses, a log of maximum sand thickness may be generated. As an alternative to 703, the 3DEX measurements may be inverted directly using the teachings of Mollison to get $R_h$ and $R_v$ 705. The determined values of $R_h$ and $R_v$ may be used to get sand fractions 707 and a log of maximum sand thickness 709.

The invention has been described above with reference to a device that is conveyed on a wireline into the borehole. The method of the invention may also be used with a multicomponent induction logging device conveyed into a borehole on a tubular, such as a drillstring. The processing of the data may be done downhole using a downhole processor at a suitable location. It is also possible to store at least a part of the data downhole in a suitable memory device, in a compressed form if necessary. Upon subsequent retrieval of the memory device during tripping of the drillstring, the data may then be retrieved from the memory device and processed uphole.

It should be noted that while the invention may have been described above with reference to a 3DEX™ logging tool, this is not to be construed as a limitation. For example, U.S. patent application Ser. No. 11/489,875 of Wang et al. discloses an arrangement in which formation resistivity measurements are obtained using an arrangement with just two axially oriented transmitters and two transverse receivers (i.e., zx-measurements). The term "multicomponent" is intended to include all arrangements in which the transmitter and receiver coils are oriented in different directions.

Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating an earth formation, the method comprising:
    making measurements with a multicomponent resistivity logging tool at a plurality of depths in a borehole in the earth formation;
    estimating from the measurements a first cumulative sand thickness in a first interval of the earth formation;
    estimating from the measurements a second cumulative sand thickness in a second interval of the earth formation, the second interval encompassing the first interval;
    using the first estimated cumulative sand thickness and the second estimated cumulative sand thickness for determining a maximum sand thickness within a portion of the second interval not included in the first interval; and
    recording the maximum sand thickness on a suitable medium.

2. The method of claim 1 wherein estimating the first cumulative sand thickness and the second cumulative sand thickness further comprises using a horizontal resistivity and a vertical resistivity derived from the measurements made by the multicomponent logging tool.

3. The method of claim 1 further comprising using the measurements made by the multicomponent resistivity logging tool for estimating at least one of (i) a dip of the formation, and (ii) an azimuth angle of the formation.

4. The method of claim 1 further comprising using the measurements made by the multicomponent resistivity logging tool for estimating at least one of (i) a dip angle of an unconformity in the formation, and (ii) an azimuth angle of an unconformity in the formation.

5. The method of claim 1 further comprising conveying logging tool into the borehole using a conveyance device selected from: (i) a wireline, (ii) a slickline, and (iii) a drilling tubular.

6. The method of claim 1 wherein if the determined maximum sand thickness is greater than a length of said portion, the method further comprises repeating step (c) for another interval encompassing the first interval.

7. An apparatus configured to evaluate an earth formation, the apparatus comprising:
    a multicomponent resistivity logging tool configured to make measurements at a plurality of depths in a borehole in the earth formation; and
    a processor configured to:
        (A) estimate from the measurements a first cumulative sand thickness in a first interval of the earth formation;
        (B) estimate from the measurements a second cumulative sand thickness in a second interval of the earth formation, the second interval encompassing the first interval;
        (C) use the first estimated cumulative sand thickness and the second estimated cumulative sand thickness to determine a maximum sand thickness within a portion of the second interval not included in the first interval; and
        (D) record the maximum sand thickness on a suitable medium.

8. The apparatus of claim 7 wherein the processor is configured to estimate the first cumulative sand thickness and the second cumulative sand thickness by further using a horizontal resistivity and a vertical resistivity derived from the measurements made by the multicomponent logging tool.

9. The apparatus of claim 7 wherein the processor is further configured to use the measurements made by the multicomponent resistivity logging tool for estimating at least one of (i) a dip of the formation, and (ii) an azimuth angle of the formation.

10. The apparatus of claim 7 wherein the processor is further configured to use the measurements made by the multicomponent resistivity logging tool for estimating at least one of (i) a dip angle of an unconformity in the formation, and (ii) an azimuth angle of an unconformity in the formation.

11. The apparatus of claim 7 further comprising a conveyance device configured to convey the logging tool into the borehole, conveyance device being selected from: (i) a wireline, (ii) a slickline, and (iii) a drilling tubular.

12. The apparatus of claim 7 wherein if the determined maximum sand thickness is greater than a length of said portion, the processor is further configured to repeat step (B) for another interval encompassing the first interval.

13. A computer-readable medium for use with an apparatus for evaluating an earth formation, the apparatus comprising:
   (a) a multicomponent resistivity logging tool configured to make measurements at a plurality of depths in a borehole in the earth formation;
   the medium comprising instructions which enable a processor to:
   (b) estimate from the measurements a first cumulative sand thickness in a first interval of the earth formation;
   (c) estimate from the measurements a second cumulative sand thickness in a second interval of the earth formation, the second interval encompassing the first interval;
   (d) use the first estimated cumulative sand thickness and the second estimated cumulative sand thickness to determine a maximum sand thickness within a portion of the second interval not included in the first interval; and
   (e) record the maximum sand thickness on a suitable medium.

14. The medium of claim 13 further comprising at least one of: (i) a ROM, (ii) an EPROM, (iii) an EEPROM, (iv) a flash memory, and (v) an optical disk.

* * * * *

UNITED STATES PATENT AND TRADEMARK OFFICE
CERTIFICATE OF CORRECTION

PATENT NO.        : 7,505,851 B2                                    Page 1 of 1
APPLICATION NO.   : 11/746963
DATED             : March 17, 2009
INVENTOR(S)       : Adriaan A. Bal, David J. Prosser and Tsili Wang It is certified that error appears in the above-identified patent and that said Letters Patent is hereby corrected as shown below:

Column 7, claim 1, line 63, delete "making", insert --(a) making--;

Column 7, claim 1, line 66, delete "estimating", insert --(b) estimating--;

Column 8, claim 1, line 1, delete "estimating", insert --(c) estimating--;

Column 8, claim 1, line 4, delete "using", insert --(d) using--;

Column 8, claim 1, line 8, delete "recording", insert --(e) recording--;

Column 8, claim 2, line 14, delete "multicomponent logging", insert --multicomponent resistivity logging--;

Column 8, claim 5, line 24, delete "conveying", insert --conveying the--;

Column 8, claim 8, line 55, delete "multicomponent logging", insert --multicomponent resistivity logging--; and Column 9, claim 11, line 3, delete "borehole, conveyance", insert --borehole, the conveyance--.

Signed and Sealed this

Seventeenth Day of November, 2009

David J. Kappos
*Director of the United States Patent and Trademark Office*